April 28, 1936.  C. E. SUMMERS  2,038,968

ENGINE MOUNTING

Filed Dec. 18, 1933

Inventor
Caleb E. Summers

By Blackmore, Spencer & Flint
Attorneys

Patented Apr. 28, 1936

2,038,968

UNITED STATES PATENT OFFICE 2,038,968

ENGINE MOUNTING

Caleb E. Summers, Pontiac, Mich., assignor to General Motors Corporation, Detroit, Mich., a corporation of Delaware Application December 18, 1933, Serial No. 702,850

2 Claims. (Cl. 248—7)

While not limited in its application, this invention will be described for convenience as an improved mounting for damping and reducing the transmission of engine vibrations to the chassis frame of a motor vehicle.

It is an object of the invention to provide an improved support by which the engine is flexibly mounted for movement in response to vibratory forces, and in which the forces spend themselves in overcoming a yielding resistance to movement.

A further object of the invention is to provide a yielding mounting by which different resistance is offered to relative movement in different directions.

Another object is to provide mounting units in spaced apart relation on opposite sides of the axis of oscillation of the engine and embodying contractible-expansible fluid chambers joined together by a fluid pressure equalizing passage through which fluid can shift between the chambers upon a rocking movement of the engine, with the moving forces being dissipated in overcoming resistance to fluid flow and without a rebounding force.

Figure 1:
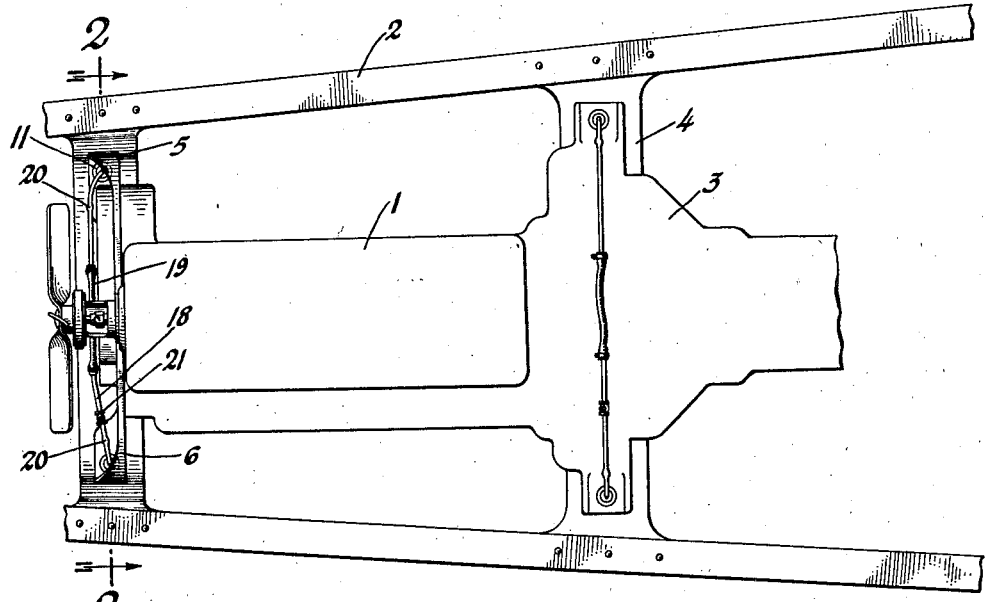
Figure 2:
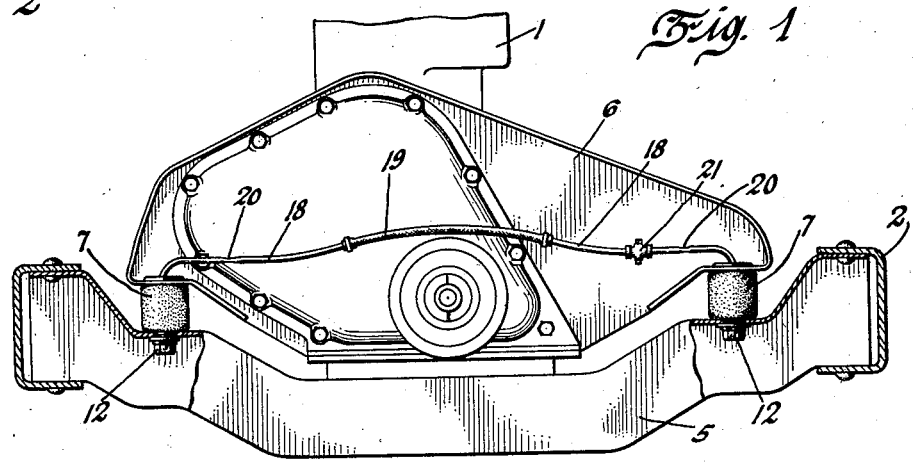

Other objects and advantages of the invention will become apparent during the course of the following detailed specification taken in connection with the accompanying drawing, wherein Figure 1 is a top plan view of an engine mounted in a chassis frame, in accordance with the invention; Figure 2 is an end elevation viewed as on line 2—2 of Figure 1, and Figure 3 is a transverse sectional view of one of the mounting units.

Referring to the drawing, the numeral 1 indicates a multiple cylinder internal combustion engine supported upon a chassis frame 2. For the purpose of illustration, the engine is shown in the drawing as being connected to the chassis frame at four points, although the number and arrangement of attachments may be varied to suit conditions. Two of the points of connection illustrated are located at the rear of the engine assembly on opposite sides of the bell housing 3, connecting the same to a cross member 4 of the chassis frame. A similar set of connections is employed at the front of the engine between the cross member 5 and the timing gear cover 6, the construction and operation of the two sets of mounting units being substantially the same.

Figure 3:
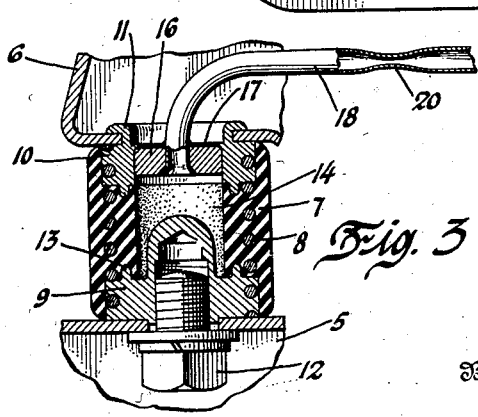

Each mounting unit, as illustrated in Figure 3, consists essentially of a liquid compartment or dashpot having flexible walls for the retention of hydraulic pressure. It includes a cylindrical wall 7 of rubber or the like, embracing a coil spring 8, and carrying end closures 9 and 10, respectively.

The member 10 is in the form of a metal ring, having an annular flange 11 adapted to extend through an opening in the timing gear cover 6 and to be riveted or peened over to permanently hold the assembly thereto. The end member 9 may consist of a nut screw threadedly receiving a mounting stud 12, by which detachable connection is made with the cross member 5.

The nut 9 and the ring 10 are each provided with helical grooves in their peripheries which receive endmost coils of the spring, and to afford a secure anchorage, the edges of the grooves may be turned inwardly around the spring coils so as to prevent dislodgment. The spring 8, after being fastened to the members 9 and 10, is preferably molded in the rubber cylinder 7, and ridges 13 may be provided on the members 9 and 10 to reinforce the bond between the rubber and metal parts. For a good surface bond, it will be desirable to brass plate the metal surfaces prior to vulcanization.

In use the rubber cylinder and coil spring serve to mutually reinforce each other, and they are so designed that their resistance to deflection will be sufficient to support the gravity weight of the power plant, while allowing relative movement between the parts against their elastic resistance.

The hollow rubber cylinder provides a container or compartment 14, which may be closed by a plug 16 secured to the ring 10 by a peened over flange 17. Soldered or otherwise secured to the plug 16 in alinement with a circular opening therein, is a small pipe or tube 18, which extends laterally toward a corresponding pipe associated with a cooperating mounting unit. The two pipes may be joined together by a suitable fitting or by a flexible cable 19, as shown in Figure 2 to provide a communicating passage between the fluid chambers of the mounting units. This passage contains one or more constrictions 20, to provide a restricted orifice of a predetermined size. In lieu of a constricted wall, use may be made of an adjustable valve 21, whose setting may be readily and easily changed to control the size of the restriction. The chambers 14 and the connecting passageway therebetween are filled with a suitable liquid which is free to flow through the passageway from one chamber to the other for equalizing the pressure in the system, the rate of flow being regulated by the restricted orifice 20. This liquid may be under an initial pressure, and by introducing the liquid prior to the time the motor weight is placed upon the mountings, any desired portion of the gravity load can be sustained by fluid pressure.

It may be mentioned here that the character and extent of vibratory motion inherent to operation, differs with various types of engines and conditions of use. Conventional automobile engines operating under changing speed and load conditions tend to move through various combinations of paths. Thus the bodily movement of an engine may be predominantly vertical at one time and horizontal at other times, and again it may seem to be a rocking about some axis which in itself is not fixed, but undergoes changes in both direction and extent of movement.

The complexity of the vibrating forces was taken into consideration in the design of the present mounting, with particular attention being given to the tendency of the engine to rock about a longitudinal axis, which is most pronounced under sudden load at low speed. The yielding resistance in the mounting unit will be found sufficient to cushion the less severe forces that cause the engine to move slightly in any plane, as it will be evident that movement can occur with a deflection of the coil spring and rubber cylinder with little or no resistance from the liquid. If, however, the forces rock the engine about a longitudinal axis intermediate the mounting units, the pressure chambers will be compressed and expanded in inverse relation, causing the liquid to shift back and forth between the two chambers through the pressure equalizing tube. By controlling the size of the restriction in the passage, the proper degree of resistance to fluid flow may be established for the effective damping of the forces.

Sidewise deflection of the resilient walls may take place to some small extent and afford a stabilizing influence whenever the arrangement of parts is such that the center line of individual mountings is out of tangential relation to the axis about which the rocking forces act. Obviously, the center line of the unit can be located, as a matter of design selection, in tangential or any other suitable relation to a given axis.

This form of hydraulic check is particularly advantageous in that there is no resulting reaction or spring back. The hydraulic pressure will reinforce the elastic container so as to make it quite resistant to any tendency for the entire motor to move up and down relatively to the frame due to road shocks, and yet the pressure yields to any required degree to cushion torque reaction because of the liquid flow from one mounting to the other.

I claim:

1. A cushion connection for use between two parts to be joined, including a pair of spaced attachment members, a coil spring having its endmost coils fixed to said members, a hollow cylinder of elastic deformable material embedding said spring therein for cooperation with said attachment members, and a body of liquid contained within said cylinder for the transmission of load between said attachment members.

2. A cushion connection for use between two parts to be joined, including a pair of spaced attachment members, a coil spring having its endmost coils fixed to said members, a hollow cylinder of elastic deformable material embedding said spring therein for cooperation with said attachment members, a body of liquid contained within said cylinder for the transmission of load between said attachment members, and liquid transfer means communicating with said cylinder and being adapted for association with the cylinder of a companion connection.

CALEB E. SUMMERS.